Jan. 7, 1936.   A. PROCOFIEFF-SEVERSKY   2,027,350
APPARATUS FOR USE IN DIRECTING THE FLIGHT OF AIRCRAFT
Original Filed July 20, 1925   5 Sheets—Sheet 1

INVENTOR.
ALEXANDER PROCOFIEFF-SEVERSKY
BY
ATTORNEYS.

Jan. 7, 1936.     A. PROCOFIEFF-SEVERSKY     2,027,350
APPARATUS FOR USE IN DIRECTING THE FLIGHT OF AIRCRAFT
Original Filed July 20, 1925    5 Sheets-Sheet 2

INVENTOR.
ALEXANDER PROCOFIEFF-SEVERSKY
BY
ATTORNEYS.

Patented Jan. 7, 1936

2,027,350

UNITED STATES PATENT OFFICE 2,027,350

APPARATUS FOR USE IN DIRECTING THE FLIGHT OF AIRCRAFT

Alexander Procofieff-Seversky, New York, N. Y., assignor to Seversky Aero Corporation Application July 20, 1925, Serial No. 44,946
Renewed September 29, 1934

25 Claims. (Cl. 33—46.5)

The present invention relates to apparatus for use in the control of the flight of aircraft.

The invention has for an object to provide an improved drift detecting and correcting arrangement and aims further to provide an automatically operative mechanism for detecting and making the corrections.

It is also an object of the invention to provide improved means for facilitating flight in a straight line.

When traveling toward an objective at a considerable elevation thereabove, it is extremely difficult to estimate the amount of lateral drift due to cross winds or the extent of movement of a moving objective laterally with respect to the course of the craft. If an incorrect allowance for lateral drift or incorrect allowance for movement of the objective is made by the pilot the approach to the objective will be in a curve and the craft will be gradually and constantly changing its direction of flight. This change of direction can be detected by noting the change of direction of a suitable indicator carried by the craft relative to a constant direction indicator such as a compass or gyroscope arranged to maintain a fixed direction in space. The present invention provides an apparatus which detects the change of direction of the craft, and, in its preferred form, includes means for automatically making corrections in the adjustment of the apparatus used in the craft for directing flight toward the objective.

When contact with the objective toward which the aircraft is traveling is interrupted, as, for example, by the appearance of a cloud or smoke screen between the aircraft and the objective, it is desirable to continue flight in the established direction until contact can be reestablished. The present invention provides an arrangement for facilitating the directing of flight by means of a fixed direction indicator such as a gyroscope or gyroscope compass and furthermore provides for changing from one method of flight control to another without introducing an error at the time of making the change.

The invention will be better understood from a description of a particular illustrative apparatus embodying the principles thereof. For the purpose of such description, reference should be had to the accompanying drawings wherein.

In the arrangement shown for the purposes of illustration a gyroscope 5 is mounted for rotation about a horizontal axis, the gyroscope casing being pivotally mounted on horizontal axis as indicated at 6 in a ring 7 which ring in turn is rotatable on a vertical axis on pivots 8, 9, in the rotatable frame 10. The gyroscope thus universally mounted will maintain its original direction even though the aircraft in which it is mounted turns.

Figures 1, 5:
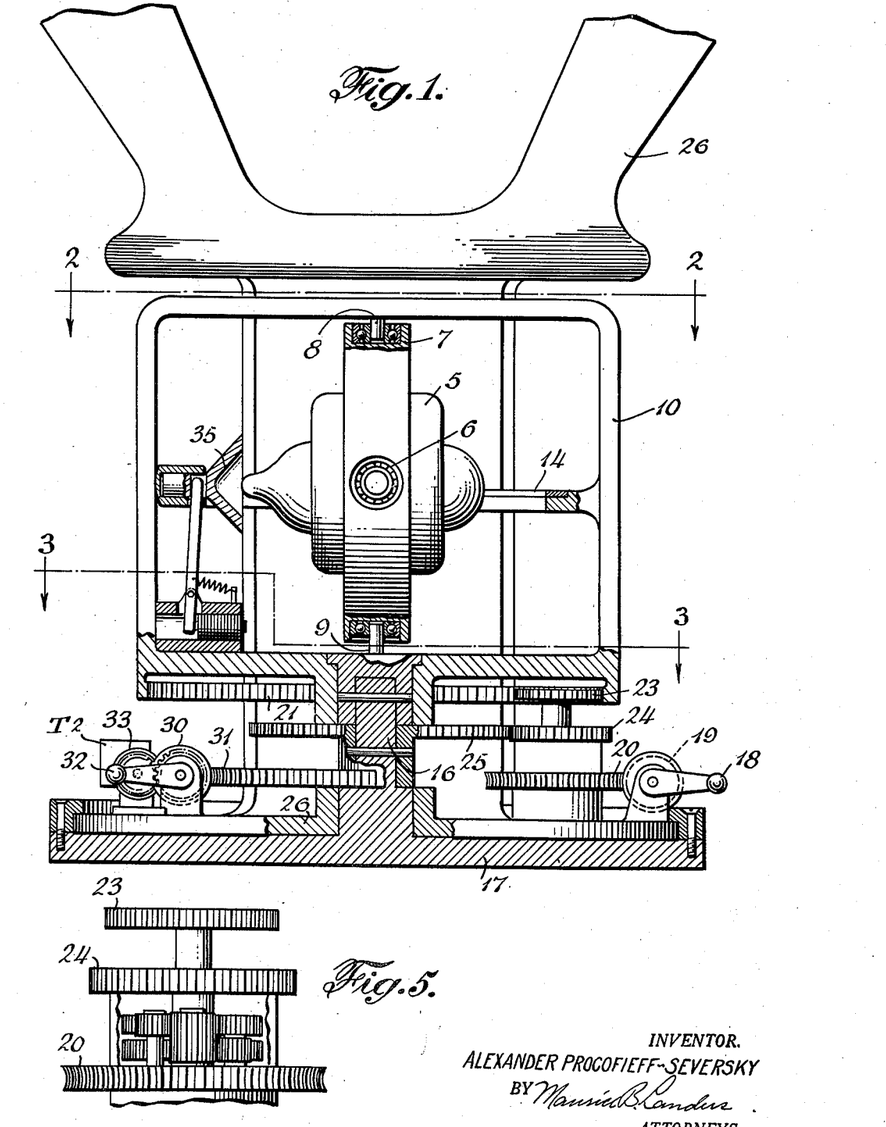
Fig. 1 is a view partly in elevation and partly in section of a sight cradle with a device embodying certain principles of the invention associated with the base thereof.
Fig. 5 is a detail view of the differential gearing.

The ring 7, moving with the gyroscope, carries a contact 12, which engages either of the two semi-circular contact elements 14, 15 carried horizontally in the frame 10. There may be a small gap between the adjacent ends of the contacts 14 and 15 which represents a dead point or position in which the movable contact roller 12 will engage neither of the contacts 14, 15. The frame 10 is rotatably mounted on a stud 16 in the base 17. This frame can be rotated about the stud by means of a hand crank 18 and worm 19 which through suitable gearing actuates the gear 23 and internal gear 21 carried by the frame. The gearing shown comprises a worm wheel 20, gears 23 and 24, and a connecting differential mechanism. This differential mechanism is best shown in Figs. 1 and 5. It is so arranged that the gears 23 and 24 can rotate in the same direction and at equal speeds of rotation when the worm gear 20 is held against rotation on the base of the sight cradle 26, as will be obvious from an examination of Fig. 5. The gear 24 meshes with the fixed gear 25 and is rotated thereby when the sight cradle is rotated by other means about the stud 16. The gear 23 meshes with the internal gear 21 of the rotatable frame 10 and operates to rotate this frame 10 either when the gear 24 is rotated by its engagement with the gear 25, as just described, or when it is rotated by means of the crank 18, driving worm 19 and worm wheel 20 while the gear 24 is held against rotation by its engagement with the gear 25. The relation of parts including the differential mechanism and the pinions and gears is such that when the worm 19 and therefore the worm wheel 20 are held in fixed position rotation of the sight cradle 26 through any angle relative to the base 17 will cause a rotation of the frame 10 through the correct angle in accordance with the design of the mechanism as, for example, through an angle one and a half times as great. As shown in Fig. 5 the differential mechanism comprises two long pinions on opposite sides each mounted on worm gear 20 which serves as a planet carrier. A pair of shorter pinions is provided for each long pinion, one engaging a pinion secured to the gear 24 and the other engaging a pinion secured to the gear 23 by means of a sleeve.

By the described arrangement correction for drift is made in a manner to cause the craft to approach the objective as nearly as possible in a straight line, each correction being made with the object of so changing the course of the craft that it will travel from the point at which that correction is made toward the target in as nearly straight a line as possible.

As distinguished from the foregoing it is sometimes desirable to maintain the course of flight as nearly as possible in the straight line from the original starting point to the objective and to return to that line when deviation therefrom is detected. In such a case the mechanism should be so designed that the position of the craft relative to the desired line of flight will be detected and it is desirable that such correction should be made as will bring the craft back to the original desired line of flight instead of merely making correction to cause the craft to approach the objective in a straight line from each new position. When such operation is desired the apparatus may be so constructed that the gyroscope will indicate always a fixed direction and any deviation between the line toward the objective and the direction indicated by the gyroscope will be detected. By this arrangement so long as the craft occupies a position laterally away from the original desired line of flight by more than a predetermined minimum detectable amount, the error will be indicated and correction will be made to bring the craft back to such desired line of flight. The apparatus heretofore described may be modified for such use by changing the ratio of the gearing so that the ring or frame 10 will have always a normal position substantially parallel to the line from the craft to the objective. The gearing may be such that the movement of the lubber ring 10 relative to the support, i. e., the craft will be equal to that of the sight cradle relative to the craft.

Figure 2:
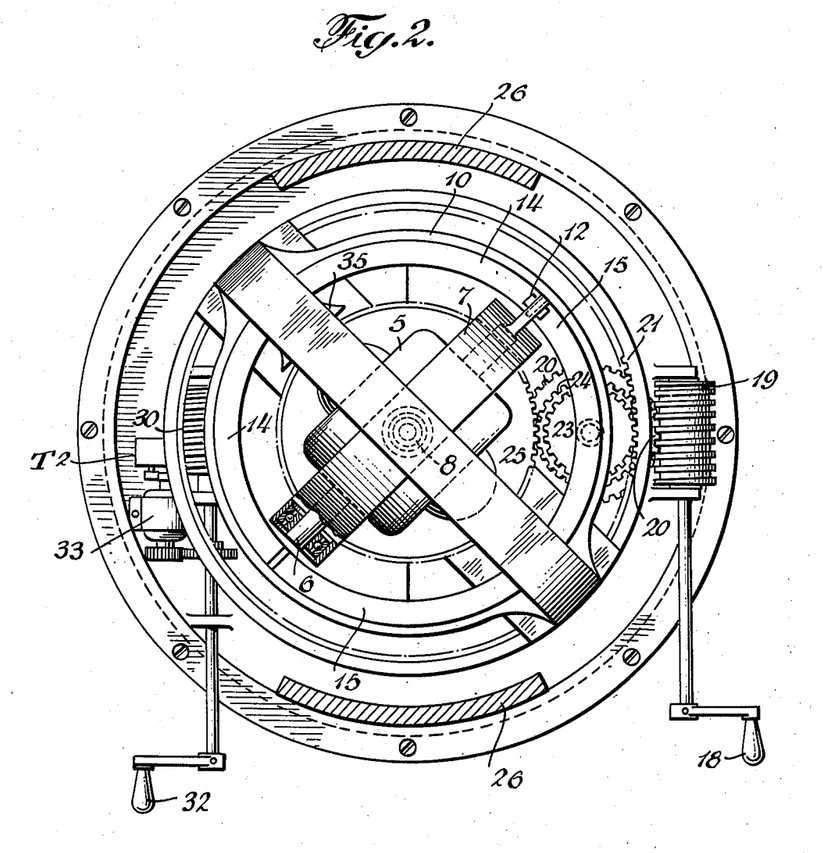
Fig. 2 is a sectional view of the same taken on the line 2—2 of Fig. 1 but showing the gyroscope and its supporting frame rotated through an angle of 45 degrees to more clearly show certain parts of the apparatus.

As shown in Fig. 2 the crank 18 and worm 19 are provided for the purpose of manual adjustment of frame 10 when desired, as, for example, when adjusting the apparatus manually for known conditions. When the system is operating automatically the sight cradle is rotated about the base 17 by means of a motor 33 actuating the worm 30 which meshes with the worm wheel segment 31 secured to the base. When desired, it may be actuated by hand by means of the crank 32 connectable to this worm.

The pilot is directed by a pilot's director 34, which indicates the condition of flight whether on the true course or to one side or the other.

Figures 3, 4:
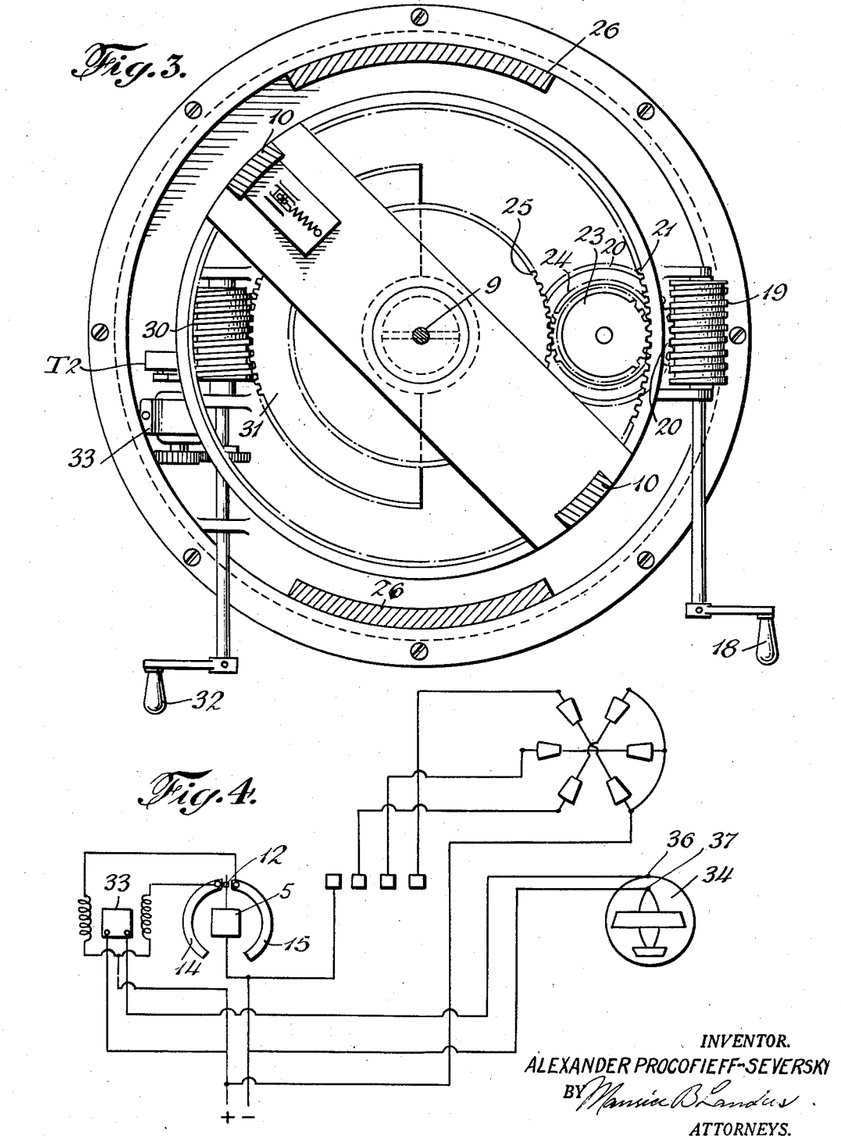
Fig. 3 is a sectional view taken on the line 3—3 of Fig. 1 also showing the supporting frame rotated through an angle of 45 degrees.
Fig. 4 is an electrical diagram showing the electrical connection of the automatic drift indicating and correcting device, and also showing the electrical connections to a pilot's director arranged to indicate to the pilot the direction of flight.
Figure 8:
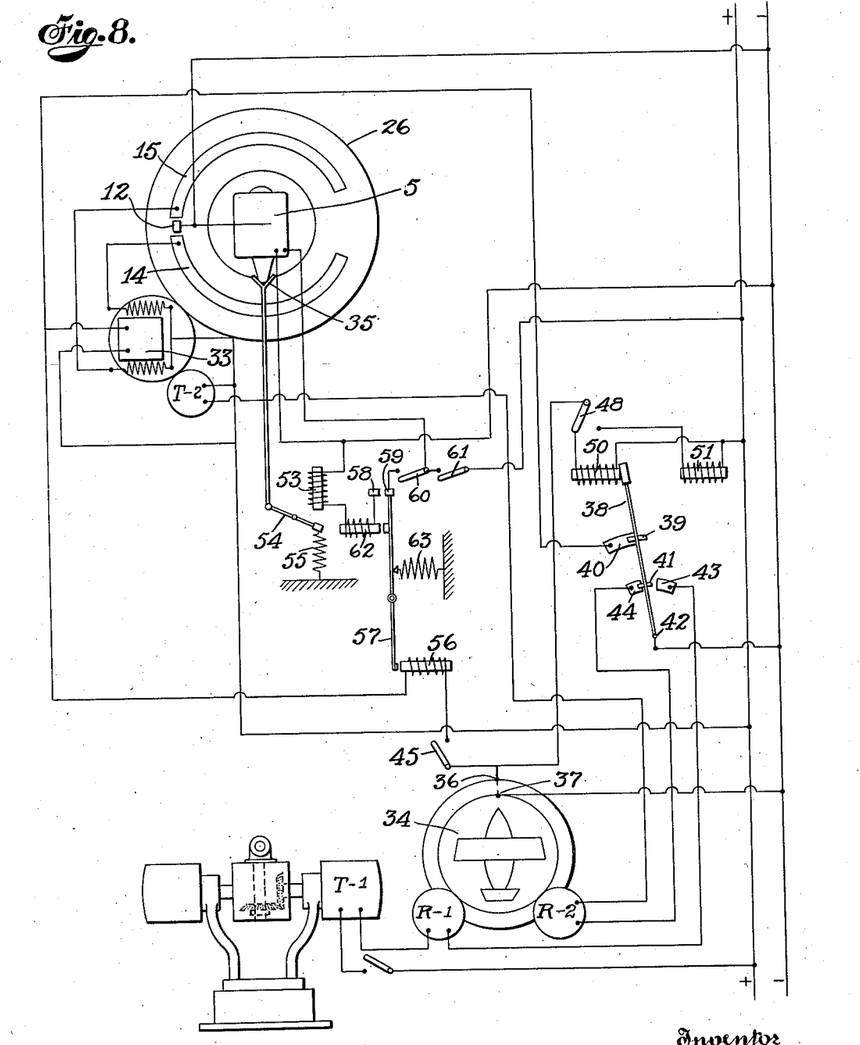
Fig. 8 is a diagrammatic view showing the connection between the sight, the pilot's director and the drift detecting and correcting apparatus.

The electrical connections as indicated in Figs. 4 and 8 are such that when through a change of direction of flight of the aircraft, the contact roller 12 engages one of the contacts 14, 15, a circuit will be closed to actuate the motor 33 to drive the worm 30 thereby rotating the sight cradle. It is to be noted that the circuit for actuating this motor is so arranged that it is closed only when the pilot's director 34 shows a zero reading, and contacts 36 and 37 engage, which indicates that the pilot is flying accurately in accordance with the indication of the apparatus, that is to say, when the craft is accurately following its course and not yawing. This provision is made to prevent automatic rotation of the sight cradle when the craft is merely yawing.

If the drift detector and corrector mechanism is positioned separately from the stable base then suitable repeater mechanism is employed to control the rotation of the sight cradle.

In the apparatus shown for the purposes of illustration, the pilot's director 34 is controlled alternatively either from a sight carried in the sight cradle 26 and which is maintained trained upon the objective or from a gyroscope or gyroscope compass operative to indicate a constant direction and means is provided for maintaining proper synchronism during the shifting from one control to the other. The gyroscope compass is preferable for long flights because it is more accurate. As indicated in the diagram, Fig. 8, the pilot's director 34 may be actuated either by a repeater R—1 which is controlled by a transmitter T—1 associated with the sight to transmit lateral angular movement of the sight S or by a repeater R—2 controlled by a transmitter T—2 associated with the drift detecting apparatus as by being connected to the motor 33 which rotates the sight cradle 26. Conventional bevel gearing is shown diagrammatically in Fig. 8 to indicate that the transmitter T—1 derives the motion to be transmitted from the lateral movement of the sight S. For the purpose of clearness in description, the pilot's director is shown as actuated simply by repeaters cooperating directly therewith, no provision being made for making correction for the effect of roll or drift as is preferable in a complete system of flight control. The expression "longitudinal axis of the sight cradle" will be used to designate that axis which is parallel to the sight when the sight is in normal mid-position and pointing horizontally forward. This axis, in operation, indicates the desired direction of flight and is maintained pointed toward the objective as nearly as possible. The sight is maintained, by the observer, directed toward the objective and if the craft turns laterally the transmitter T—1 will actuate the pilot's director 34 and the pilot thus advised will correct the flight to direct the said "longitudinal axis" toward the objective.

The arrangement for control of flight by means of the gyroscope or gyroscope compass will be understood by reference to Fig. 8. As indicated, a transmitter T—2 is associated with the drift detecting mechanism to rotate with one of the elements, preferably the sight cradle, and for convenience this transmitter is operatively connected to the motor 33, which rotates the sight cradle.

The arrangement should be such that proper synchronism of all parts of the apparatus will be obtained and maintained. As a convenient method of obtaining this result without the necessity for a more complicated arrangement in which the transmitters T—1 and T—2 are always synchronized the shift from one control to the other may be made when the pilot's director indicates true flight by showing a zero reading. The transmitter T—2 and repeater R—2 are so constructed and arranged that when their circuit is closed by switch 38 the then existing relation will continue as their synchronized relation. The zero reading of the pilot's director will therefore thereafter correspond to the then existing rotative position of the sight cradle 26.

When the pilot's director is controlled from the gyroscope, that is to say when it is controlled by the sight cradle and associated mechanism, the armature circuit of the motor 33 should be maintained closed in order that upon closing of either field circuit the motor may immediately operate, and to this end a short circuit around connection 36, 37 of the pilot's director is provided. This short circuit is shown as controlled by the contacts 39, 40 of the switch 38.

In operation, when controlling flight by means of the gyroscope 5, if the aircraft turns through an angle greater than the half of the gap between the contacts 14 and 15, then the contact 12 will engage one of the said contacts, thus closing the field circuit of the motor 33, and this motor will immediately operate to rotate the sight cradle, and, therefore, the frame 10 carrying the contacts 14 and 15. This rotation will be transmitted by the transmitter T—2 and repeater R—2 to the pilot's director 34, thus indicating to the pilot that the craft has turned and directing a correction in the direction of flight. As soon as the direction of flight has been corrected, the contact 12 will engage the other of the contacts 14, 15, causing a reverse operation of the motor 33, reverse rotation of the sight cradle and reverse rotation of the pilot's director, thus showing the pilot that the desired correction has been made. It may be noted also that the extent of turning from the true course will be indicated by a corresponding extent of movement of the pilot's director.

The switch 38 is provided, in order that the observer may shift at will from one control to the other, and it is so arranged that it will be operated only when the pilot's director shows zero reading. The switch 38 controls two circuits, first, that through the transmitter T—1 and repeater R—1, and, second, the short circuit for the contacts 36, 37 of the pilot's director, by which the armature circuit of motor 33 is closed.

The movable contacts 39, 41 of the switch are connected to the negative source of current as indicated at 42. The contact element 41 is arranged to engage either the contact 43 of the circuit through the transmitter T—1 and repeater R—1, or contact 44 of the circuit through the transmitter T—2 and repeater R—2. The contact element 39 of the switch is arranged to engage either the contact element 40 of the circuit through the motor 33 or to be disengaged therefrom leaving this circuit open.

The contacts 39 and 41 are of such length and so arranged that all circuits are closed at the moment of shifting from one set of circuits to the other in order that the transmitters and repeaters of neither circuit can race.

In order that the switch 38 may be thrown only when the pilot's director indicates a zero reading an electrical arrangement is provided such that the observer may throw an auxiliary switch 48 and the switch 38 will then be thrown immediately if the pilot's director is indicating a zero reading, and if not, it will be thrown as soon as a zero reading is indicated. As shown, solenoids 50, 51 are arranged in alternative circuits between the positive source of current and the contact 36 of the pilot's director, whereby the selected circuit is completed only when the zero reading is indicated.

When it is desired to shift from the sight system of control to the gyroscope system of control, the observer moves the hand switch 48 to the left, and when the contact 36, 37 engages the solenoid 50 will actuate the switch 38 to the left, thus closing the circuit through the transmitter T—2 and the repeater R—2, and also connecting the armature circuit of the motor directly to the negative source of current independently of the connection from this armature through the contacts 36, 37 of the pilot's director. By this arrangement the motor 33 will be connected to be actuated whenever the contact 12 engages either of the arcuate circuits 14, 15, regardless of the position of the pilot's director.

A suitable device is provided for holding the gyroscope suitably positioned either when the electric circuit through which it is driven is open or when it is desired to hold it positively against free movement. This device comprises a cone-shaped member 52 which engages a projection on the gyroscope 5 and which is urged inwardly by means of a spring tending to bring the gyroscope to and hold it in a central position. Provision is made whereby the gyroscope can be so released that it will indicate accurately a desired direction toward the objective. As shown, the controlling cone 35 is arranged to be released by means of a solenoid 53, acting upon an armature of lever 54 against the action of a spring 55. The circuit through the solenoid 53 is arranged to be closed by means of solenoid 56, acting upon an armature of a lever 57, which solenoid 56 is arranged in the armature circuit of motor 33 and that circuit in turn is arranged to be closed only when the pilot's director indicates a zero reading and the contacts 36 and 37 are in engagement. The movement of the lever 57 causes engagement of contacts 58, 59, whereupon if hand switches 60 and 61 are closed the solenoid 53 will be energized to retract the cone 52 and also a solenoid 62 will be energized to maintain the contacts 58 and 59 in engagement against the action of a spring 63.

By this arrangement the gyroscope is caused to indicate a particular desired direction toward the objective and when once started will continue to indicate this direction, the cone 52 being held free of engagement with the gyroscope. In starting the gyroscope the switch 61 will first be closed, starting the gyroscope motor and thereafter switch 60 will be closed. Ordinarily the switch 45 would already have been closed.

It is contemplated that ordinarily the gyroscope 5 will be stopped when it is desired to make corrections by hand, as for example, in starting upon a new course or when a large angle of drift is approximately known and it is desired to set manually for such angle of drift. The gyroscope can then be started when adjustments have been made.

*Theory of operation*

Figure 6:
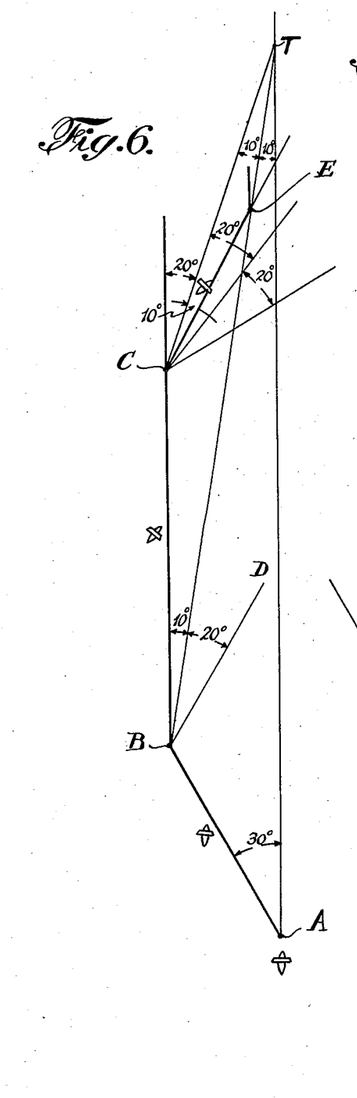
Fig. 6 is a diagram indicating the principle of operation of the illustrative apparatus shown when used to direct flight toward an objective.

We will assume for the purpose of this explanation and diagrammatical illustration that the drift corrector is designed to detect a drift of 10° but nothing smaller and that when this drift of 10° is detected a correction of twice this amount is automatically made, that is to say, the sight cradle is rotated relative to the support, i. e., the craft through an angle of 20°. Referring to Fig. 6, we will assume flight from the point "A" toward the objective "T" without making any preliminary correction for drift under conditions such that the lateral drift is 30°. When the aircraft reaches the point "B" it will have travelled laterally through a distance such that the line toward the objective "B T" makes an angle of 10° with the original line of intended flight or the "true course" "A T", and this angle of 10° will be detected and a correction of twice this amount, that is 20°, will be made and the sight cradle rotated accordingly through an angle of 20° by the motor 33.

Now by means of the gearing previously described, the lubber ring or frame 10 will be rotated through an angle of 30° relative to the support, i. e., the aircraft; that is to say, it will be rotated through an angle equal to one and a half times the angle through which the sight cradle is rotated. This is as it should be, for the aircraft will now, as soon as the pilot corrects his flight, be pointed in the direction "B D" but the axis of the gyroscope will lie in the direction "B C". The lubber ring should therefore be rotated through an angle of 30°, that is through the angle "C B D", so that as long as the course along line "B T" is maintained without drift, no contact will be made to readjust for drift.

For the purposes of this description we will assume that the craft continues to drift at an angle of 30°. Inasmuch as the lubber ring has been shifted 10°, the drift from the true course toward the objective, that is from the line "B T", will be 10°. When it has drifted sufficiently from this course so that the compass indicates a difference in the line toward the objective of 10°, a further correction of 20° will automatically be made. Referring to Fig. 6, when the craft reaches the point C the direction of the line toward the objective relative to the gyroscope will have changed 10° and this 10° will have been detected. Accordingly, the motor 33 will be actuated to rotate the sight cradle relative to the craft, through an angle of 20° to make correction for the drift, and the lubber ring or frame 10 will also be rotated through a further angle of 30° as heretofore explained. In this case, however, the correction will prove to have been too great since the entire drift relative to the line toward the objective was, as a matter of fact, 10° and the correction of 20° was therefore too great. As the plane further approaches the objective the line toward the objective will gradually change in relation to the gyroscope but in the opposite direction. When the craft reaches the point "E" a change of 10° in the angle toward the objective will again be detected and correction will again be made automatically as before but in the opposite direction. If the pilot is in fact watching the operation of the mechanism he will become aware of the fact that the angle of drift is between the two limits and he may, if desired, make manual correction to approach the objective more nearly in true line. Ordinarily, however, the apparatus will be designed to detect a much smaller change in the angle between the line toward the objective and the line of fixed direction as indicated by the gyroscope. If, for example, the apparatus is designed to detect and correct for a drift of 1° then the pilot will be able to approach the objective in a course never varying more than 1° from the true direction and this will be sufficient for practical purposes.

The operation of the device may be somewhat clearer if considered from another point of view. Let us assume that during the first few moments of flight and before the correcting mechanism has had time to function, the craft travels from the point "A" to the point "B", Fig. 6. Now since the sight is maintained on the target, the angle of the line of sight would lie at an angle of 10 degrees to the original line of intended flight or the true course "A T" and therefore at an angle of 10 degrees to the axis of the gyroscope and, since the sight cradle is still in its initial position relative to the craft, the fore and aft axis of the cradle 26 will also lie at an angle of 10 degrees to the axis of the gyroscope and the frame 10, since it is still in original position relative to the sight cradle, will also lie with its axis at an angle of 10 degrees to the axis of the gyroscope. The contact element 12 will therefore ride on one of the semi-circular contact elements 14, 15 at an angle of 10 degrees from the center. As the result of the closing of the electric circuit, the motor 33 will be actuated to rotate the base 26 of the sight cradle. The gearing connections of the frame 10 previously described will cause the frame 10 to be rotated simultaneously with the rotation of the sight cradle but at one and one-half times the angular speed. Now, the motor 33 will continue to be driven until the frame is rotated through a sufficient angle so that the contact element 12 ceases to engage with the semi-circular contact element. If the gap between the adjacent ends of the contact element 14, 15 is zero, then the motor 33 will continue to operate until the frame 10 has been moved through an angle of 10 degrees relative to the gyroscope to bring the contact 12 to the gap between contacts 14 and 15.

Now the pilot will in fact so adjust the flight of the craft in response to the indications of the pilot's director as controlled from the sight that the sight cradle will be maintained with its axis toward the target and the motor 33 will continue to operate until the sight cradle has been rotated through an angle of 20° relative to the aircraft, and the frame 10 has been rotated through an angle of 30° relative to the craft with the result of moving the frame 10 through an angle of 10° relative to the sight cradle. This will bring the contact 12 to the gap between contacts 14 and 15. If there is a gap of, for example, 1° between the contacts 14 and 15 the actual movement of the parts will be less but the ratios of movement will be as indicated.

It will be understood that the foregoing description in which it is indicated that only a variation of a predetermined angle will be detected and in which the correction made is twice the angle of the error detected as illustrative merely.

The operation of the apparatus when designed to facilitate the travel of the craft along a predetermined straight line between the starting point and an objective is much the same as that previously described but differs in that the position of the craft laterally with respect to the predetermined line between the starting point and objective, which for convenience may be called the true course, is first detected and then correction is made to bring the craft back as nearly as possible to this true course.

Figure 7:
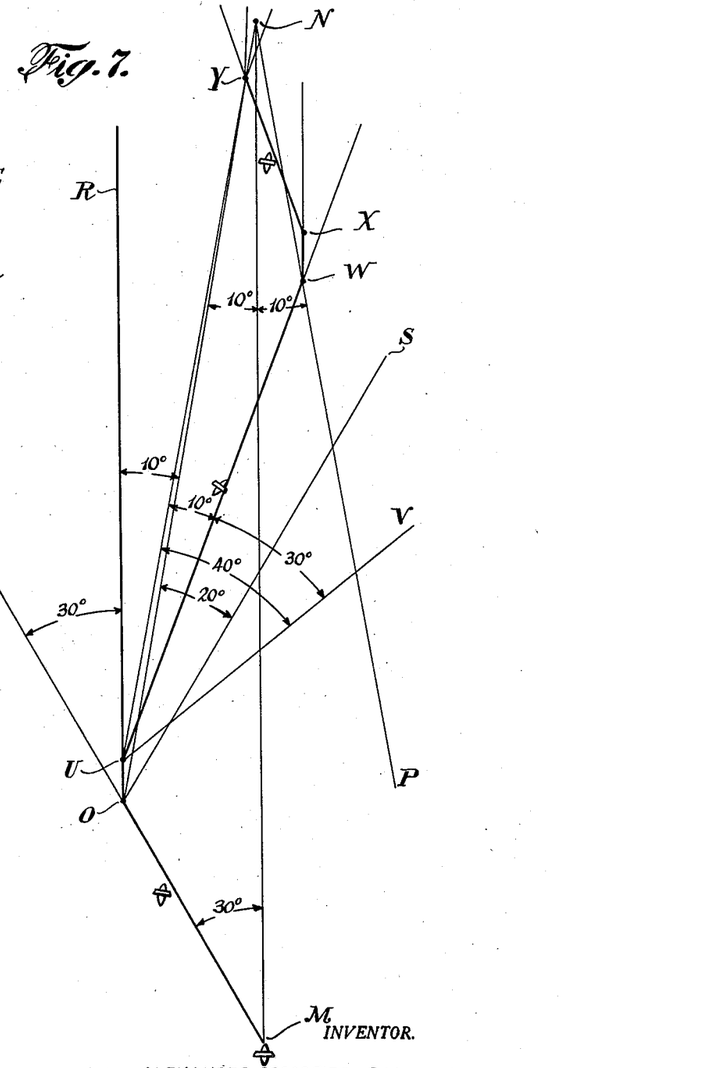
Fig. 7 is a similar diagram indicating the principle of operation when the apparatus is used to direct flight along a predetermined straight line.

Referring to Fig. 7, we will assume for the purpose of description that the apparatus is designed to detect, as a minimum, a deviation of 10° between the line of fixed direction as indicated by the gyroscope and the line toward the objective and automatically and immediately to make a correction of twice this amount. The gyroscope will be set to operate to indicate the line of fixed direction always parallel to the proposed line of flight. Now if the line "M N" indicates the true course between the starting point and the objective and the lines "N O" and "N P" are drawn on either side of the line "N M" and at an angle of 10° thereto, then, whenever the craft passes outside of the angle "O N P" the deviation will be more than 10° and will be detected.

Now let us assume that the craft starts flight under such conditions that there is a lateral drift of 30°. It will then travel along the line "M O"; when it reaches the point "O" the angle between the line of fixed direction "O R" and the line toward the objective "O N" will be 10°, and will be detected and the electrical contact being made a correction of 20° will then automatically be made, that is to say, the sight cradle will be rotated through an angle of 20° relative to its support. Therefore, as the observer sights upon the objective "N" the axis of the craft will lie in the direction "O S". If we assume that the craft continues to drift at an angle of 30° then it will travel along the line "O R", that is to say, along a line at an angle of 30° to the line "O S". In the example illustrated, this line is by chance parallel to the line "M N". We will assume that the craft during the making of this correction travels from the point "O" to the point "U". Now, inasmuch as the craft is still outside of the angle "O N M", the angle between the line of fixed direction "U R" and the line toward the objective "U N" will be greater than 10° and will be detected by the detector mechanism, that is to say, the electrical contact will be made (or still maintained) and a correction of 20° will again be made. Now the total correction will be 40° and the axis of the craft will lie in the line "U V" at an angle of 40° to the line toward the objective "U N", but the craft still drifting 30° will travel along the line "U W". We will assume that the craft passes within the angle "M N O" before the mechanism has had itme to again operate to make correction. On this assumption the craft will travel along the line "U W" until it reaches the point "W" on the line "N P" before the detector mechanism again operates. At this point correction will be made as heretofore but in the opposite direction and the craft will travel in the direction of "W X". A second correction will then be made as heretofore and the craft will travel along the line "X Y."

It will be obvious that this operation is such as to maintain the craft within the angle "O N P" and therefore relatively close to the true course "M N". It will be understood that in practice the detector mechanism will be designed to detect a much smaller angle as for example 1° or less, and a correspondingly more correct flight will be maintained. Ordinarily, a sufficient accuracy may be obtained by an arrangement wherein a limited variation in either direction, as for example a variation of 1° may be made without causing the detecting and correcting mechanism to operate. It will be understood, however, that a constantly operating mechanism could be constructed to hunt constantly if greater accuracy is desired.

In the foregoing explanation of the theory of operation of the device no allowance has been made for the fact that the craft travelling towards the objective while drifting, would in fact travel in a curved line. The description of this element has been avoided for the sake of simplicity of explanation.

If after flight toward an observed objective has been started and the drift correcting apparatus has caused more or less complete adjustment of the apparatus, a cloud or smoke obscures the objective then the observer will shift to control by the gyroscope and continue such flight until the objective is again visible or is passed.

Ordinarily the observer can see a cloud or smoke in time to shift the control while the objective is still visible.

The foregoing description of a particular apparatus is illustrative merely and is not intended as defining the limits of the invention.

Having now particularly described and ascertained the nature of my said invention and in what manner the same is to be performed, I claim:

1. Flight directing apparatus for use in aircraft comprising in combination, a sight arranged to be continuously trained on an objective, a device supporting said sight adjustable in accordance with the angle of drift of the craft, and means controlled automatically by the turning of the craft through a predetermined angle from a desired course for adjusting said device through an angle greater than the angle of turning of the craft.

2. Flight directing apparatus for use in aircraft comprising in combination a pilot's director, a const. nt direction indicator, an indicator arranged to indicate the direction of the bearing of an objective and means operable alternatively to control said pilot's director from either indicator.

3. Flight directing apparatus for use in aircraft comprising in combination a rotatable sight cradle, a constant direction indicator, means operable automatically upon relative angular movement between the sight cradle and the constant direction indicating device for rotating the sight cradle, a pilot's director and connections operable alternatively for controlling said pilot's director either from the movement of the sight relative to the sight cradle or from the movement of the sight cradle.

4. In flight directing apparatus for use in aircraft in combination a gyroscope, means for holding a movable element of said gyroscope in fixed relation to its support, means for releasing the holding means arranged to operate only when the air craft is headed in a desired predetermined direction.

5. In flight directing apparatus for use in aircraft in combination a constant direction indicator, a pilot's director, means for holding the constant direction indicator in fixed relation relative to the craft, means for releasing the constant direction indicator operatively connected with the pilot's director to operate only when the pilot's director indicates a zero reading.

6. Flight directing apparatus for use in aircraft comprising in combination a sight arranged to be trained continuously on an objective, a support in which said sight is mounted, a constant direction indicator, a pilot's director and means connected to the constant direction indicator and actuated automatically by turning of the craft relative to said constant direction indicator for adjusting the sight support and means controlled by the pilot's director to prevent adjustment under predetermined conditions.

7. Flight directing apparatus for use in aircraft comprising in combination, a sight cradle rotatable about a substantially vertical axis, a sight movably mounted on said sight cradle and means for indicating lateral movement of the sight relative to the sight cradle, a constant direction indicator, means operable automatically and controlled by relative angular movement between the sight cradle and the constant direction indicating device as the craft turns for rotating the sight cradle relative to the craft through an angle greater than the angle of turning of the craft.

8. In apparatus for use in directing the course of movable craft, in combination, a gyroscope arranged to maintain a constant direction in a horizontal plane, a frame within which said gyroscope is mounted for universal pivotal movement, a sight cradle, arranged to be set with its longitudinal axis indicating the desired direction of flight, a sight mounted on and movable relative to said sight cradle, means for indicating lateral movements of the sight relative to the sight cradle to facilitate steering the craft toward an objective, and means responsive to relative angular movement between said gyroscope and frame arranged to rotate said frame and said sight cradle through different angles having a predetermined relation to each other.

9. Flight directing apparatus for use in aircraft comprising in combination a base, a sight cradle rotatable relative to said base, and arranged to be set at an angle corresponding to an assumed angle of drift, a sight movable in said sight cradle and means for indicating lateral movement of the sight relative to the sight cradle, an indicator movable to indicate the turning of the craft and means controlled by said indicator operable automatically upon turning of the craft through an angle in one direction to rotate the sight cradle relative to the craft in the opposite direction through an angle greater than the angle of turning of the craft to indicate a corrected angle of drift.

10. Flight directing apparatus for use in aircraft comprising, in combination, a sight cradle, a sight mounted therein, a pilot's director controlled to indicate lateral movements of the sight relative to the sight cradle only, a constant direction indicator, and means for rotating the sight cradle through an angle which is greater than the relative angular movement of the constant direction indicator but in the same direction to provide for correcting the direction of flight to allow for drift of the craft, substantially as described.

11. In apparatus for use in directing the course of aircraft, in combination, a base, a sight cradle rotatable about a vertical axis on said base and arranged to be set to the desired line of flight, a sight pivoted for lateral movement in said cradle, a constant direction indicator, a detector frame cooperating with the constant direction indicator to detect horizontal angular relative movement between the constant direction indicator and the base, said detector frame being angularly movable to vary its zero position relative to the base, a pilot's director and means responsive to lateral movement of the sight relative to the sight cradle for controlling the pilot's director to indicate lateral movements of the sight from its normal position, means controlled by the detector frame to rotate the sight cradle relative to the base in the direction of the detected relative movement of the constant direction indicator but through an angle approximately twice as great and to move the detector frame through an angle approximately one and one-half times as great as the angle through which the sight cradle is moved and in the same direction relative to the base.

12. In apparatus for use in directing the course of aircraft, in combination, a base, a sight cradle rotatable about a vertical axis on said base and arranged to be set with its longitudinal axis at an angle to the axis of the craft corresponding to the angle of drift and indicating the desired line of flight, a sight element pivoted for lateral movement relative to said cradle, a constant direction indicator, a detector cooperating with the constant direction indicator to detect horizontal angular movement of the constant direction indicator relative to the sight cradle, and means to rotate the sight cradle relative to the base in the direction of the detected angular movement but through a greater angle whereby the axis of the sight cradle indicates a corrected desired line of flight.

13. In a drift correcting apparatus for use in guiding the flight of aircraft, in combination, a base, a sight cradle rotatable on a vertical axis on said base arranged to be set with its longitudinal axis at an angle to the axis of the craft corresponding to the angle of drift and indicating the desired line of flight, a sight movable on said sight cradle and arranged to be trained on an objective, a constant direction indicator, a detector cooperating with the constant direction indicator to detect horizontal angular movement of the constant direction indicator relative to the sight cradle as the craft deviates from the desired course, a pilot's director and means associated with the sight on the sight cradle to control the pilot's director to indicate deviation of the sight from the vertical plane through the longitudinal axis of the sight cradle.

14. In a drift correcting apparatus for use in guiding the flight of aircraft, in combination, a base, a sight cradle rotatable on a vertical axis on said base arranged to be set with its longitudinal axis at an angle to the axis of the craft corresponding to the angle of drift and indicating the desired line of flight, a sight movable on said sight cradle and arranged to be trained on an objective, a constant direction indicator, a detector cooperating with the constant direction indicator to detect angular movement relative to the sight cradle, a motor connected to rotate the sight cradle relative to the base in the direction of the detected relative angular movement of the constant direction indicator but through a greater angle, whereby the sight cradle is reset with its longitudinal axis indicating a corrected desired line of flight.

15. In a drift correcting apparatus for use in guiding the flight of aircraft, in combination, a base, a sight cradle rotatable on a vertical axis on said base arranged to be set with its longitudinal axis at an angle to the axis of the craft corresponding to the angle of drift and indicating the desired line of flight, a sight movable on said sight cradle and arranged to be trained on an objective, a constant direction indicator, a detector cooperating with the constant direction indicator to detect horizontal angular movement of the constant direction indicator relative to the sight cradle, a motor connected to rotate the sight cradle whereby its longitudinal axis will indicate a corrected desired line of flight, and means controlled by movement of the sight to prevent rotation of the sight cradle by said motor when the sight deviates laterally from the vertical plane through the longitudinal axis of the sight cradle.

16. Flight directing apparatus for use in aircraft comprising, in combination, a sight cradle rotatable about a substantially vertical axis and arranged to be set with longitudinal axis at an angle to the longitudinal axis of the craft approximating the angle of drift and indicating the desired direction of flight toward the objective, a sight on the sight cradle to assist in guiding the craft, a constant direction indicator, detector means for detecting angular movement of the constant direction indicator relative to the sight cradle due to turning of the craft, and means controlled by the detector means and operable to rotate the sight cradle in the direction of the relative angular movement of the constant direction indicator and through a greater angle and to move the detector means about the axis of the constant direction indicator in the same direction and through an angle approximately equal to the sum of the angle of movement detected and the angle of movement of the sight cradle.

17. Flight directing apparatus for use in aircraft comprising, in combination, a base, a sight cradle rotatable on a substantially vertical axis and adapted to be set with its longitudinal axis at an angle to the axis of the craft approximating the angle of drift, a sight mounted in the sight cradle to facilitate flight in the direction indicated by the longitudinal axis of the sight cradle, a constant direction indicator, detector means for detecting relative angular movement between the constant direction indicator and the sight cradle, a motor and connections for rotating the sight cradle controlled by the detector means, and means for preventing rotation of the sight cradle by said motor when the sight indicates deviation in flight from the direction of flight indicated by the longitudinal axis of the sight cradle.

18. Flight directing apparatus for use in aircraft comprising, in combination, a base, a sight cradle rotatable on the base on a substantially vertical axis and adapted to be so set that its longitudinal axis is oblique laterally to the longitudinal axis of the craft at an angle approximating the angle of drift of the craft, a constant direction indicator, detector means for detecting horizontal angular movement of the constant direction indicator relative to the sight cradle and means controlled by said detector means for rotating the sight cradle on the base in the direction of the detected relative angular movement of the constant direction indicator and through a greater angle to a fresh setting to approximate a corrected angle of drift, said detector means being operative to detect horizontal angular movement of the constant direction indicator relative to the sight cradle in its new position.

19. In apparatus for use in directing the course of movable craft, in combination, a gyroscope arranged to maintain a constant direction in a horizontal plane, a frame within which said gyroscope is mounted for universal pivotal movement, a sight cradle, means arranged to rotate said frame and said cradle through angles having a predetermined relation to each other comprising a motor and electric circuits controlled by relative angular movement of the gyroscope and frame with differential gearing connected to rotate the cradle and frame, together with means for actuating the gearing to rotate the frame independently relative to said sight cradle.

20. In apparatus for use in directing the course of movable craft, in combination, a gyroscope arranged to maintain a constant direction in a horizontal plane, a frame within which said gyroscope is mounted for universal pivotal movement, a sight cradle, a pilot's director, a motor arranged to rotate the sight cradle, control circuits for actuating said motor arranged to be closed when the pilot's director and the gyroscope and frame are in certain predetermined relative positions.

21. In apparatus for use in directing the course of movable craft, in combination, a sight cradle adjustable to an angular position corresponding to the direction of the objective, a sight universally pivoted therein, a constant direction indicator, an element partaking of the angular movement of the craft in a horizontal plane, means responsive to relative movement of the constant direction indicator and said element operative to control the angular position of the sight cradle and to rotate it in the same direction through an angle different from but having a predetermined relation to the relative angular movement of the constant direction indicator.

22. In apparatus for use in directing the flight of an aircraft, in combination, a gyroscope, a sight support, a sight movably mounted therein and arranged to be trained upon a target, and means controlled by relative movement between the gyroscope and sight support as the sight is maintained upon a target for rotating the sight support to correct for drift of the craft when the craft is turned to redirect the sight upon the target.

23. Flight directing apparatus for use in aircraft, comprising, in combination, a sight support rotatable on a vertical axis, a sight pivoted therein to be universally movable, means for indicating the lateral turning of the sight relative to the sight support, a gyroscope arranged to maintain a constant direction, means responsive to relative angular movement between said sight support and said gyroscope as the sight is trained upon an objective to rotate said sight support on said vertical axis through an angle having a predetermined relation to the extent of the angular movement between said sight support and gyroscope.

24. Flight directing apparatus for use in aircraft comprising, in combination, a constant direction indicator, a sight adjustable to be trained upon the objective, a sight cradle in which said sight is adjustably mounted, and means responsive to relative angular movement between said sight and indicator to adjust said sight cradle in accordance with the angle of drift of the craft and to positions independent of the angular position of the constant direction indicator, said means being operable automatically upon turning of the craft.

25. In apparatus for use in directing the course of movable craft, in combination, a sight cradle adjustable to an angular position corresponding to the direction of the objective, a sight pivoted therein to be universally adjustable and freely adjustable by hand to permit following the target, a constant direction indicator, an element partaking of the angular movement of the craft in a horizontal plane, means responsive to relative movement of the constant direction indicator and said element operative to rotate the sight cradle in a predetermined ratio of movement and means responsive to movements of the sight without interfering with the free movement of the sight for indicating the angle between the sight and sight cradle.

ALEXANDER PROCOFIEFF-SEVERSKY.